United States Patent
Ryon et al.

(10) Patent No.: US 9,556,795 B2
(45) Date of Patent: Jan. 31, 2017

(54) INTEGRATED HEAT SHIELD

(71) Applicant: Delavan Inc, West Des Moines, IA (US)

(72) Inventors: Jason A. Ryon, Carlisle, IA (US); Brett A. Pfeffer, Waukee, IA (US); Matthew R. Donovan, Ankeny, IA (US); Philip E. Buelow, West Des Moines, IA (US)

(73) Assignee: Delavan Inc, West Des Moines, IA (US)

( * ) Notice: Subject to any disclaimer, the term of this patent is extended or adjusted under 35 U.S.C. 154(b) by 416 days.

(21) Appl. No.: 14/190,535

(22) Filed: Feb. 26, 2014

(65) Prior Publication Data

US 2015/0069148 A1  Mar. 12, 2015

Related U.S. Application Data

(60) Provisional application No. 61/874,553, filed on Sep. 6, 2013.

(51) Int. Cl.
| | |
|---|---|
| F02C 7/22 | (2006.01) |
| F23R 3/28 | (2006.01) |
| F23R 3/36 | (2006.01) |
| F23D 11/10 | (2006.01) |
| F23D 11/38 | (2006.01) |
| F02C 7/24 | (2006.01) |

(52) U.S. Cl.
CPC . *F02C 7/22* (2013.01); *F02C 7/24* (2013.01); *F23D 11/106* (2013.01); *F23D 11/38* (2013.01); *F23R 3/283* (2013.01); *F23D 2213/00* (2013.01); *F23D 2900/00016* (2013.01); *F23R 2900/00004* (2013.01)

(58) Field of Classification Search
CPC ............ F23R 3/28; F23R 3/283; F23R 3/286; F23R 3/36; F02C 7/22
See application file for complete search history.

(56) References Cited

U.S. PATENT DOCUMENTS

| | | | |
|---|---|---|---|
| 4,258,680 A * | 3/1981 | Eckert | F02B 23/02 123/254 |
| 4,854,127 A | 8/1989 | Vinson | |
| 5,351,477 A * | 10/1994 | Joshi | F23C 7/004 239/400 |

(Continued)

FOREIGN PATENT DOCUMENTS

| | | |
|---|---|---|
| EP | 1811229 | 7/2007 |
| EP | 1811229 A2 | 7/2007 |

(Continued)

OTHER PUBLICATIONS

The European Search Report for European Patent Application No. EP14183668.4, dated Mar. 5, 2015.

(Continued)

*Primary Examiner* — Gerald L Sung
*Assistant Examiner* — Rene Ford
(74) *Attorney, Agent, or Firm* — Locke Lord LLP; Scott D. Wofsy; Arpita G. Buesing

(57) ABSTRACT

A fuel injector for a gas turbine engine includes a nozzle tip assembly having a substantially monolithically formed nozzle body. The nozzle body has an annular outlet chamber for issuing a spray from the nozzle tip. A feed channel is in fluid communication with the outlet chamber through a feed passage. A heat shield void substantially surrounds the feed channel(s).

12 Claims, 2 Drawing Sheets

(56) References Cited

U.S. PATENT DOCUMENTS

| | | | | |
|---|---|---|---|---|
| 5,404,711 | A * | 4/1995 | Rajput | F23D 14/02 239/400 |
| 5,423,173 | A * | 6/1995 | Lemon | F23L 7/00 60/39.463 |
| 5,675,971 | A * | 10/1997 | Angel | F23R 3/286 239/405 |
| 6,543,235 | B1 | 4/2003 | Crocker et al. | |
| 6,622,488 | B2 * | 9/2003 | Mansour | F23D 11/107 239/403 |
| 6,655,145 | B2 * | 12/2003 | Boardman | F23R 3/286 60/737 |
| 6,755,024 | B1 * | 6/2004 | Mao | F23D 11/107 239/416 |
| 7,028,483 | B2 * | 4/2006 | Mansour | F02C 7/22 60/740 |
| 7,926,744 | B2 * | 4/2011 | Thomson | F23R 3/28 239/405 |
| 8,806,871 | B2 * | 8/2014 | McMasters | F23R 3/14 60/740 |
| 2003/0164410 | A1 * | 9/2003 | Steinthorsson | F23R 3/28 239/533.2 |
| 2003/0221429 | A1 * | 12/2003 | Laing | F23D 11/36 60/740 |
| 2004/0040310 | A1 * | 3/2004 | Prociw | F23D 11/107 60/776 |
| 2004/0250547 | A1 * | 12/2004 | Mancini | F23D 11/107 60/740 |
| 2009/0008474 | A1 * | 1/2009 | Miyake | F02C 7/228 239/88 |
| 2009/0038312 | A1 * | 2/2009 | Hernandez | F23D 11/36 60/748 |
| 2009/0255120 | A1 * | 10/2009 | McMasters | F23D 11/383 29/889.2 |
| 2009/0255262 | A1 | 10/2009 | McMasters et al. | |
| 2009/0255264 | A1 * | 10/2009 | McMasters | F02K 9/52 60/747 |
| 2010/0044472 | A1 * | 2/2010 | Smith | F02M 53/04 239/589 |
| 2012/0198852 | A1 * | 8/2012 | Hernandez | F23D 11/36 60/740 |
| 2012/0228397 | A1 * | 9/2012 | Thomson | F23R 3/28 239/13 |
| 2012/0234944 | A1 * | 9/2012 | Overman | F23D 11/106 239/553.5 |
| 2012/0237411 | A1 * | 9/2012 | Steinhaus | F23D 11/16 422/198 |
| 2013/0200179 | A1 * | 8/2013 | Buelow | F23D 11/383 239/463 |
| 2014/0090394 | A1 * | 4/2014 | Low | F23R 3/28 60/776 |
| 2014/0291418 | A1 * | 10/2014 | Ruffing | F23R 3/14 239/403 |

FOREIGN PATENT DOCUMENTS

| | | | | |
|---|---|---|---|---|
| FR | | 985652 A | * 7/1951 | F23D 11/26 |
| GB | | 2471238 A | 12/2010 | |

OTHER PUBLICATIONS

Communication from European Patent Office in corresponding application No. 14183668.4-1605, dated May 23, 2016.

* cited by examiner

INTEGRATED HEAT SHIELD

CROSS-REFERENCE TO RELATED APPLICATIONS

This application claims the benefit of and priority to U.S. Provisional Patent Application No. 61/874,553 filed Sep. 6, 2013 which is incorporated by reference herein in its entirety.

BACKGROUND OF THE INVENTION

1. Field of the Invention

The subject invention relates to fuel injectors, and more particularly to fuel injectors for gas turbine engines and the like.

2. Description of Related Art

Gas turbine engines must satisfy high demands with respect to reliability, weight, performance, economic efficiency and durability. Among other things, the use of advanced manufacturing methods and material selection play a decisive role in meeting these requirements.

Conventional methods for manufacturing gas turbine components include forging and investment casting. For example, the highly stressed components in the compressor region of a gas turbine are typically manufactured by forging, whereas the rotor and stator blades of the turbine are typically manufactured by investment casting.

Fuel injectors for gas turbine engines often include a complex nozzle tip assembly for delivering atomized fuel to the engine combustor that includes a cast swirler and multiple sub-assemblies. In addition, intricate assembly methods and machining processes are required to meet specified performance criteria for many nozzle assemblies.

Such conventional methods and systems generally have been considered satisfactory for their intended purpose. There remains a need in the art for improved devices and methods for producing nozzles, injectors and the like. There also remains a need for such devices and methods that are easy to make and use. The present disclosure provides a solution for these problems.

SUMMARY OF THE INVENTION

A fuel injector for a gas turbine engine includes a nozzle tip assembly having a substantially monolithically formed nozzle body is presented. The nozzle body has an annular outlet chamber for issuing a spray from the nozzle tip. A feed channel is in fluid communication with the outlet chamber, e.g., through a feed passage. A heat shield void substantially surrounds the feed channel.

The heat shield void can be a single continuous insulation void that extends circumferentially around the feed passage relative to the longitudinal axis defined by the nozzle tip assembly. The heat shield void can be interrupted by one or more isolated thermal paths that support solid material within the heat shield void from solid material in the nozzle tip assembly outside the heat shield void. The feed passage is defined through one of the isolated thermal paths. The heat shield void can include a pocket surrounding the feed passage to reduce stress in the nozzle tip that is intended to protect the fuel circuit from high temperatures of the surrounding environment.

The nozzle body as described above can be formed by direct metal laser sintering or other additive manufacturing processes. The nozzle body can further include a powder escape passage configured to remove the excess powder collected after direct metal laser sintering of the nozzle body. The nozzle body can further include a plurality of feed channels and the heat shield void that can substantially surround the feed channels.

Another exemplary embodiment of a fuel injector for a gas turbine engine includes a nozzle tip assembly having a substantially monolithic nozzle body having a feed channel, an outlet in fluid communication with the feed channel, and a heat shield void surrounding the feed channel.

The feed channel can be a primary fluid channel to supply fluid through the outlet, which can be a central opening of the nozzle body. A secondary fluid channel can also be included having a secondary outlet.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
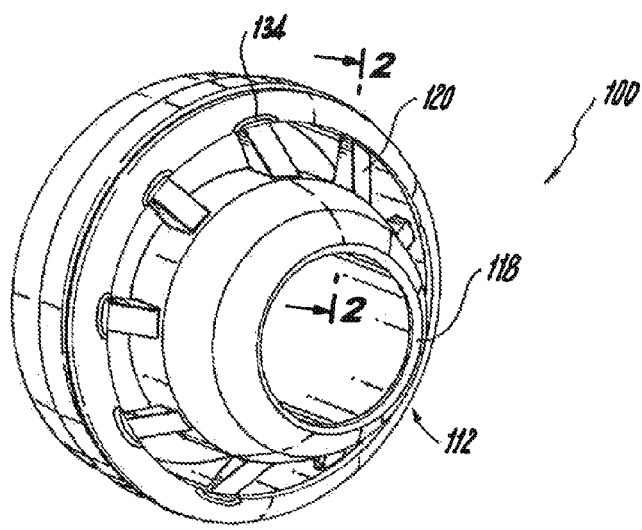
FIG. 1 is a schematic perspective view of an exemplary embodiment of a nozzle body of the subject disclosure, showing a solid form representing an insulator void.

Reference will now be made to the drawings wherein like reference numerals identify similar structural features or aspects of the subject disclosure. For purposes of explanation and illustration, and not limitation, a partial view of an exemplary embodiment of the nozzle body in accordance with the disclosure is shown in FIG. 1 and is designated generally by reference character 100. Other embodiments of the nozzle body in accordance with the disclosure, or aspects thereof, are provided in FIGS. 3 and 4, as will be described.

A typical fuel injector includes an elongated feed arm, having an inlet assembly at the upper end thereof and a nozzle tip assembly at the lower end thereof. The nozzle tip assembly of the known fuel injector includes a plurality of separately machined parts or components that are assembled using numerous braze and weld joints, which tend to limit the efficient manufacturability of the assembly.

Figure 2:
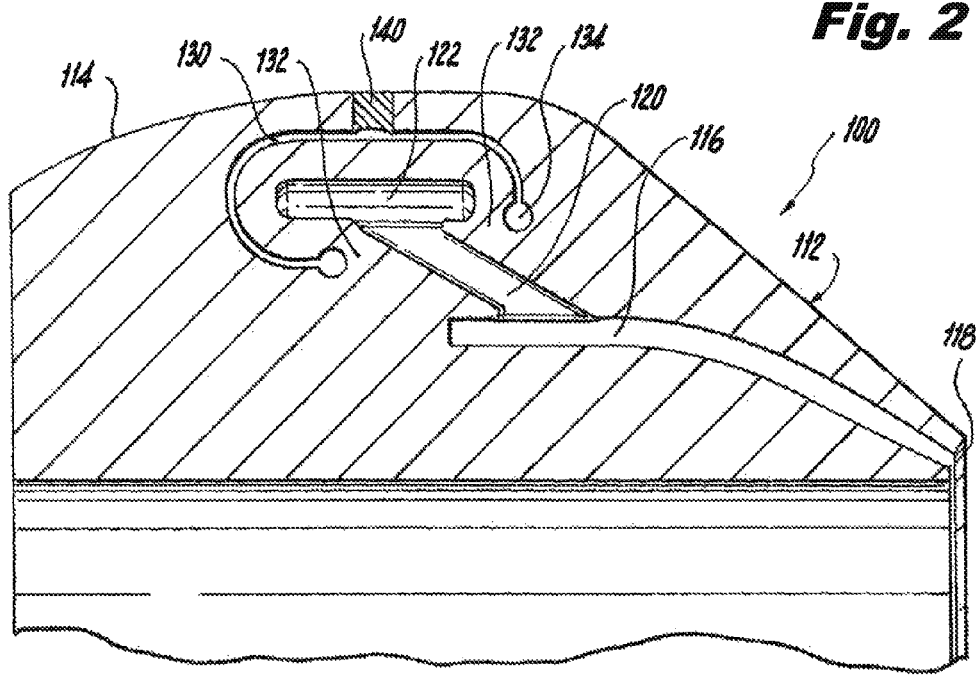
FIG. 2 is a cross sectional view of the additively manufactured nozzle body of the subject disclosure taken along line 2-2 of FIG. 1.

In contrast to the traditional fuel injectors, the exemplary embodiment fuel injector of the subject disclosure, which is shown in FIGS. 1 and 2 and designated generally by reference numeral 100, includes a nozzle tip assembly 112 having an additively manufactured, monolithically formed nozzle body 114. Those skilled in the art will readily appreciate that the term additive manufacturing, as used herein, encompasses techniques such as laser additive deposition, laser metal deposition, direct laser deposition, direct metal deposition, laser cladding and the like.

In accordance with an exemplary embodiment, the present disclosure relates to the use of a rapid construction method for producing the nozzle body 114 of nozzle tip assembly 112. Specifically, direct metal laser sintering (DMLS) can be used to manufacture a monolithic nozzle body that eliminates joints, brazing and other aspects of the prior art nozzle construction. DMLS is an additive layer process that produces a metal component directly from a computer assisted design (CAD) model using a laser and a fine metal powder (e.g., cobalt and/or chrome alloy powders and Nickel-based alloy powders are especially suited for the turbine nozzle application disclosed herein, but the invention is not so limited).

The CAD model is sliced into thin layers (on the order of 0.02 mm) and the layers are then reconstructed layer by layer, with the laser fusing programmed areas of each powder layer in succession to the underlying layer. The layer thickness is generally chosen based on a consideration of accuracy versus speed of manufacture.

Referring now to FIG. 1, a cross-sectional view of the nozzle tip assembly 112 includes a substantially monolithically formed nozzle body 114 which includes an annular outlet chamber 116 for issuing a spray from a nozzle tip 118. A feed channel 122 is in fluid communication with the outlet chamber 116 through a feed passage 120.

In typical nozzle tip assemblies, there is a potential for internal leaking and carbon growth deposits on the internal fuel passages and heat shield gaps of the nozzle which are created by high external temperatures during steady-state or transient condition (i.e. shutdown). To prevent internal carbon growth in fuel passageways of the fuel injector, a heat shield void 130 is monolithically formed substantially surrounding the feed channel 122.

The heat shield void 130 is a single continuous insulation gap that extends circumferentially around the feed channel 122 relative to a longitudinal axis defined by the nozzle tip assembly 112. The heat shield void 130 is interrupted by isolated thermal paths 132 that support solid material within the heat shield void 130 from solid material in the nozzle tip assembly 112 outside the heat shield void 130.

In the exemplary embodiment, the feed passage 120 is defined through the isolated thermal paths 132. The isolated thermal paths 132 are designed such that they are located only at the highest cooling points of the fuel circuits so that the heat cannot penetrate into an area in the fuel circuit which would have the propensity to have high wetted wall temperatures which could otherwise result in internal carbon growth. The heat shield void 130 can be isolated from all other circuits, which also allows the use of advanced cooling concepts such as actively pumping a coolant through the void circuit or evaporating a working fluid contained within the heat shield void as part of a heat pipe mechanism.

The heat shield void 130 further includes a cavity 134 with rounded corners, shown in FIG. 2, surrounding the feed passage 120. The cavity 134 provides stress reducing features that mitigate the thermal or mechanical stresses. The cavity 134 is further intended to protect the fuel circuit from high temperatures of the surrounding environment.

In addition, the nozzle body 114 includes a powder escape passage 140 configured to remove the excess powder collected within the heat shield cavity after DMLS formation of the nozzle body. The powder escape passage 140 is disposed exterior to the heat shield void so as to allow any excess powder used in manufacturing to escape from the nozzle body 114, and can thereafter be sealed, e.g. by welding.

Figure 3:
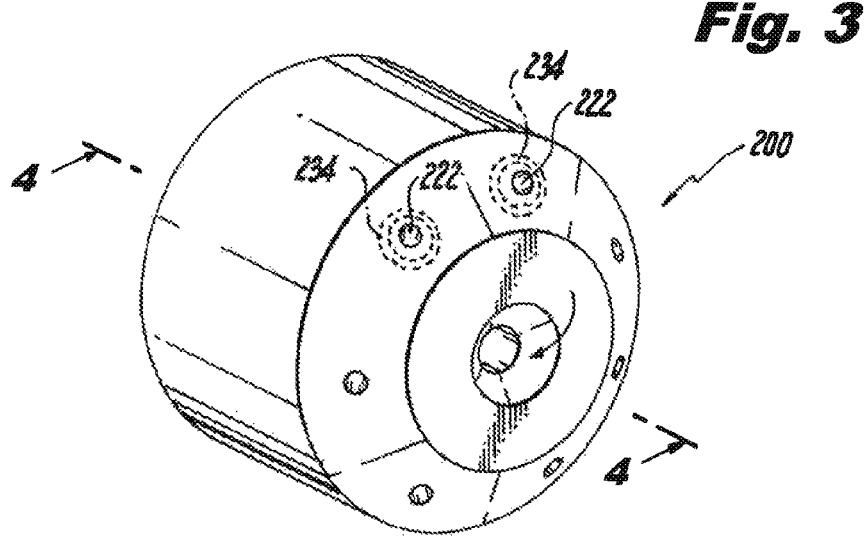
FIG. 3 is a perspective view of another exemplary embodiment of the nozzle body of the subject disclosure.
Figure 4:
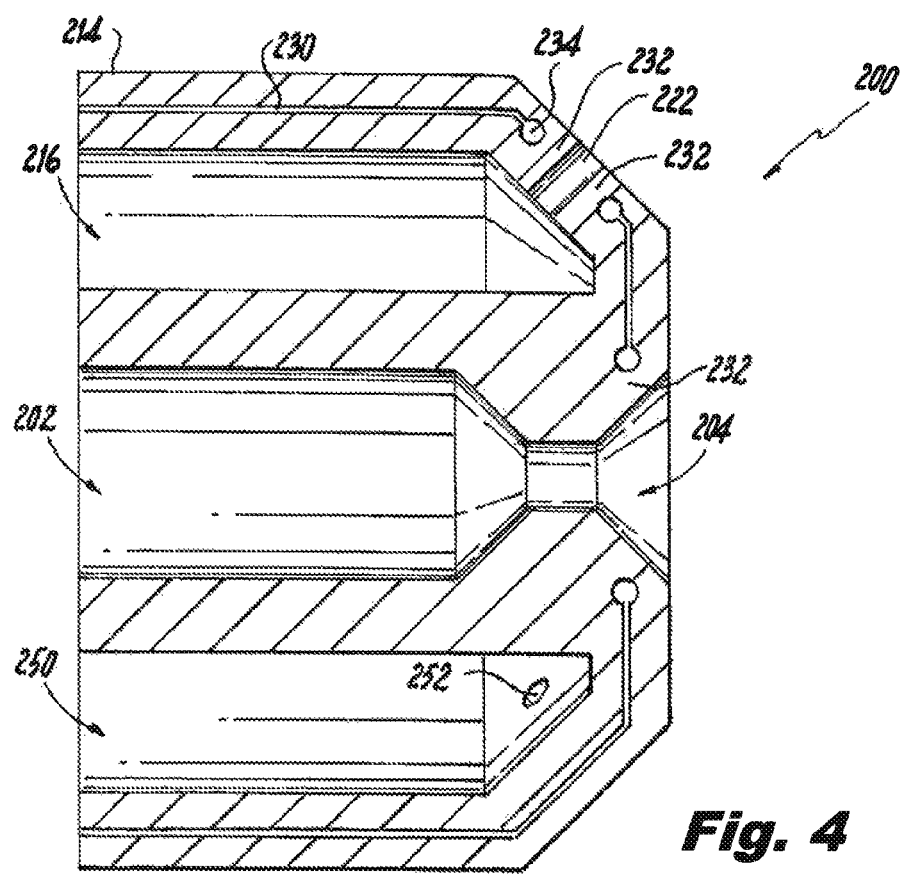
FIG. 4 is a cross sectional view of another exemplary embodiment of the nozzle body of the subject disclosure taken along line 4-4 of FIG. 3.

FIGS. 3 and 4 illustrate another exemplary embodiment 200 of the subject invention, wherein a primary fluid channel 202 supplies fluid through a central opening 204 of the nozzle body 214. This embodiment allows for multiple outlets of the fluid flow through the nozzle body 214. This embodiment includes a secondary feed channel 250 having a plurality of secondary outlets 252.

Similar to the embodiment shown in FIGS. 1 and 2, a feed channel 216 is in fluid communication with the outlet 222. A heat shield void 230 substantially surrounds the outlet chamber 222 and the central opening 204 of the primary fluid channel 202. The heat shield void 230 is interrupted by isolated thermal paths 232 that surround the nozzle body 214 and more 5 particularly the feed channel 216 a central opening 204 of a primary fluid channel 202. The feed channel 216 is defined through the central isolated thermal paths 232. In addition, a rounded cavity 234, similar to 134, surrounds each of the feed channel 216 and a secondary feed channel 250 to reduce stress to the nozzle body 214.

The methods and systems of the present disclosure, as described above and shown in the drawings, provide for a monolithically formed nozzle body with superior properties including the addition of heat shield voids to prevent internal carbon growth. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A fuel injector for a gas turbine engine comprising:
a nozzle tip including a substantially monolithic nozzle body having:
an annular outlet chamber for issuing a spray of fuel from the nozzle tip;
a feed channel in fluid communication with the annular outlet chamber through a feed passage; and
a heat shield extending circumferentially and axially to surround the feed channel relative to a longitudinal axis defined by the nozzle tip, the heat shield void further extending from a radial position outside of the feed passage to a position radially interior of the feed passage, wherein the heat shield void is an internal cavity of the nozzle body that is sealed from the fuel and any other fluids flowing through or around the fuel injector.

2. The fuel injector as recited claim 1, wherein an isolated thermal path of solid material is positioned radially inside the heat shield.

3. The fuel injector as recited in claim 2, wherein the feed passage is defined through the isolated thermal path.

4. The fuel injector as recited in claim 3, wherein the heat shield void includes rounded portions surrounding the feed passage to reduce stress in the nozzle tip.

5. The fuel injector as recited in claim 4, wherein the nozzle body is formed by direct metal laser sintering.

6. The fuel injector as recited in claim 5, wherein the nozzle body further includes a powder escape passage configured to remove the excess powder collected after direct metal laser sintering of the nozzle body.

7. The fuel injector as recited in 6, wherein the nozzle body further includes a plurality of feed channels and the heat shield void substantially surrounds at least one of the feed channels.

8. A fuel injector for a gas turbine engine comprising:
a nozzle tip including a substantially monolithic nozzle body having:

an annular outlet chamber for issuing a spray of fuel from the nozzle tip;
a feed channel in fluid communication with the annular outlet chamber; and
a heat shield void extending circumferentially and axially to surround the feed channel relative to a longitudinal axis define by the nozzle tip, the heat shield void further extending from a radial position outside of the feed passage to a position radially interior of the feed passage, wherein the heat shield void is an internal cavity of the nozzle body that is sealed from the fuel and any other fluids flowing through or around the fuel infector.

9. The fuel injector as recited in claim 8, wherein isolated thermal paths of solid material are positioned radially inside the heat shield void and are circumferentially spaced apart around the feed channel.

10. The fuel injector as recited in claim 9, wherein an outlet orifice is defined through each isolated thermal path.

11. The fuel injector as recited in claim 10, wherein the heat shield void includes rounded portions surrounding each isolated thermal path to reduce stress in the nozzle tip.

12. The fuel injector as recited in claim 11, wherein the nozzle body is formed by direct metal laser sintering.

* * * * *